(No Model.) 2 Sheets—Sheet 1.

H. HARTSUFF & J. MURPHY
WIRE NAIL FEEDER.

No. 445,344. Patented Jan. 27, 1891.

Witnesses
Albert B. Blackwood
Jos H Blackwood

Inventors
Henry Hartsuff
Joseph Murphy
By J. O. McCleary
Attorney

THE NORRIS PETERS CO., PHOTO-LITHO., WASHINGTON, D. C.

(No Model.) 2 Sheets—Sheet 2.
H. HARTSUFF & J. MURPHY.
WIRE NAIL FEEDER.
No. 445,344. Patented Jan. 27, 1891.
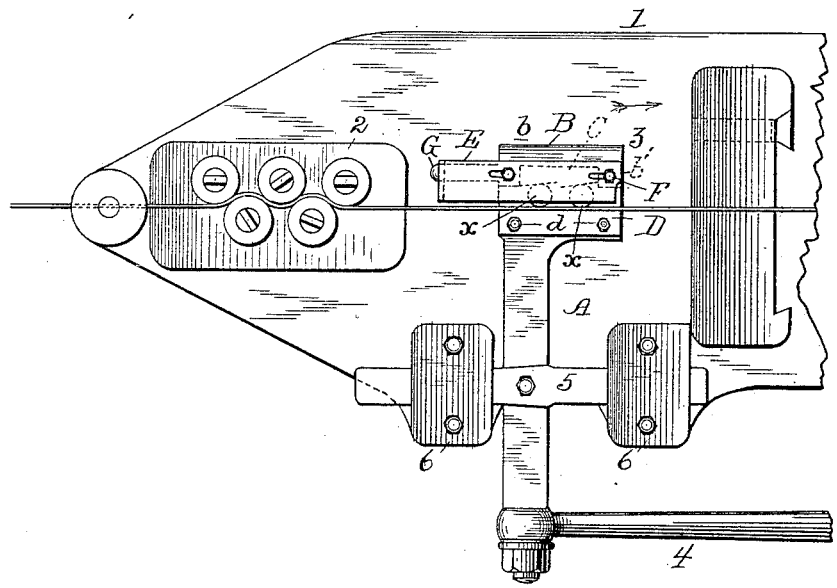
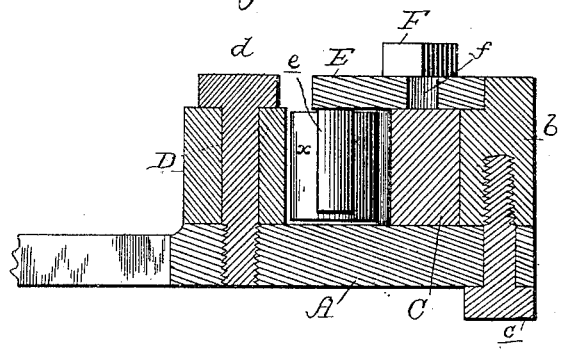
Witnesses
Thos. E. Robertson.
A. M. White.
Inventors
Henry Hartsuff
Joseph Murphy
By T. J. W. Robertson.
Attorney

UNITED STATES PATENT OFFICE.

HENRY HARTSUFF AND JOSEPH MURPHY, OF NEW CASTLE, PENNSYLVANIA.

WIRE-NAIL FEEDER.

SPECIFICATION forming part of Letters Patent No. 445,344, dated January 27, 1891.

Application filed July 19, 1890. Serial No. 359,266. (No model.)

*To all whom it may concern:*

Be it known that we, HENRY HARTSUFF and JOSEPH MURPHY, citizens of the United States, residing at New Castle, in the county of Lawrence and State of Pennsylvania, have invented certain new and useful Improvements in Wire-Nail Feeders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our improvement relates to a wire-nail feeder designed to overcome the difficulties encountered in the use of the present style of feeders, whereby the machine may be continuously used without the stoppages required in the use of the ordinary feeder; and the invention consists in the peculiar construction, arrangement, and combinations of parts hereinafter more particularly described, and then definitely claimed.

Figure 1:
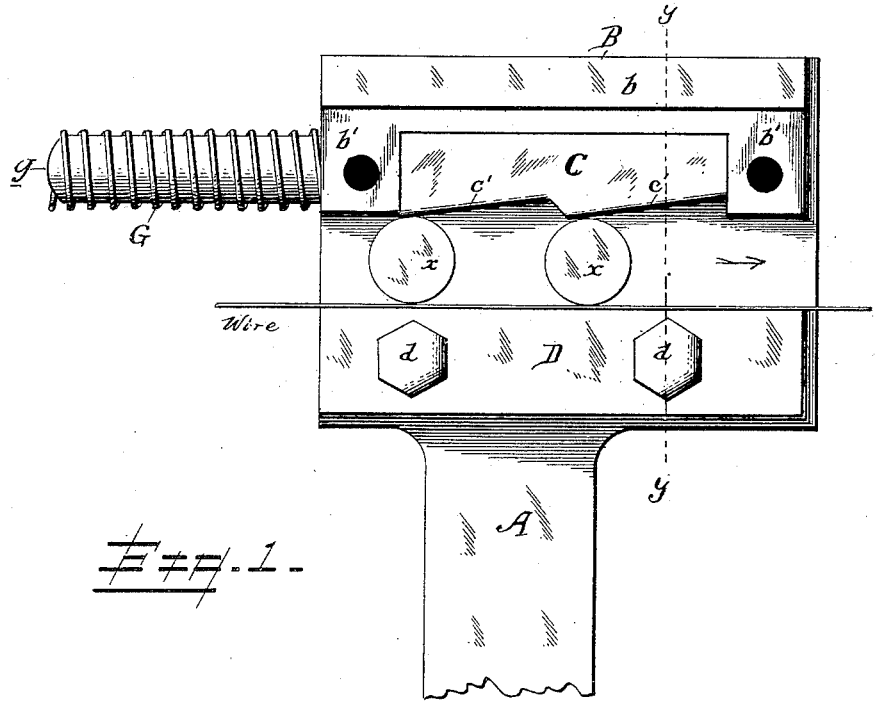
Figure 2:
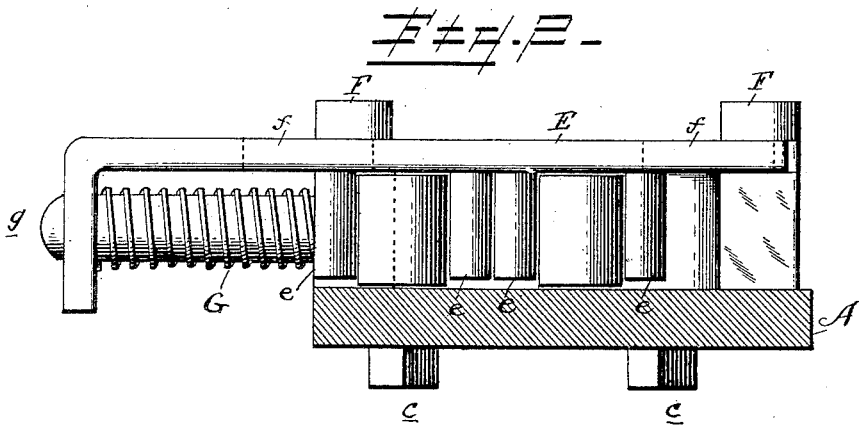

In the accompanying drawings, Figure 1 shows a plan view of a feeder constructed according to our improvement with parts removed. Fig. 2 is a side view of the same, partly in section. Fig. 3 is a plan on a smaller scale of parts of a wire-nail machine provided with our improvement. Fig. 4 is a vertical cross-section of the feeder on the line $y\ y$, Fig. 1.

Referring now to the details of construction by figures and letters, 1 indicates the frame of the nail-machine provided with the straightener 2, from which the wire passes to the feeder 3 in the ordinary manner. This feeder derives a reciprocating motion from the main shaft (not shown) of the machine in any suitable manner, but preferably through the medium of a connecting-rod 4, which is pivotally connected with the feed-bar A, so as to give the latter a sliding motion. The bar A is connected to a slide 5, working in bearings 6 6 in the ordinary manner, so as to guide the feeder in its movements in feeding the wire.

The feeder proper has a wedge-holder B secured to it by bolts $c$ and consisting of a bar $b$, having rectangular ends $b'$, forming a recess in which sets a double wedge C. On the opposite side of the feeder is a plain bar D, secured to it by bolts $d$. Between said bar D and the double wedge C are two rollers $x\ x$, which are loosely held in position by means of pairs of pins $e\ e$, carried by a plate E, secured to the feeder by bolts F passing through slots $f$ in said plate E (see Fig. 2) and into threaded holes in the ends $b'$. One end of the plate E is bent at right angles, and in said end is a hole which receives a stud $g$, around which is a spiral spring G that forces the plate F always to the left, thus keeping the rollers in contact with the inclined sides of the wedge-bar C and the wire.

The operation is as follows: A reciprocating motion being imparted to the feeder by means of the connecting-rod 4 as it moves in the direction of the arrow, the rollers $x\ x$ hold the wire fast between them and the bar D, and as the feeder moves the wire moves with it and is fed into the machine a distance substantially corresponding to the length of stroke of the feeder. During the time the die of the machine is operating on the wire the feeder moves backward and the rollers move slightly toward the narrow part of the wedges, and thus, there being less pressure between said rollers and the bar D, the feeder does not have any effect on the wire, and it remains stationary; but as soon as the forward motion of the feeder again begins the rollers (being kept in contact with the wire by the pins on the spring-actuated plate E) immediately commence to bind on the wire and hold it fast between them and the bar D, and thus feed the wire forward into the machine, as before stated. Heretofore this feeding of the wire has usually been done by a chisel-edged pivoted dog, which must be sharpened every few minutes, which requires that the machine shall be stopped every time that the dog requires sharpening. By our arrangement this waste of time and the expense of sharpening are avoided, as our device will constantly operate without any sharpening at all, as it feeds by friction alone and does not depend on the sharp-edged dog commonly used to hold and feed the wire.

We are aware that it has been proposed to use feeders having rollers running on bearings; but we do not claim this, inasmuch as these rollers bear on the wire with an equal pressure both in the backward and forward stroke, while the pressure on the wire on the return-stroke in our feeder is lessened, thus requiring less power to move the feeder when going backward. Moreover, the feed in our arrangement is positive, whereas there must be a tendency to slip in the class of feeders above referred to.

Having thus described one way of carrying out our invention, but without limiting ourselves to the exact construction shown, we claim as new—

1. The combination, with a nail-machine, of a reciprocating feeder provided with a tapering recess through which the material to be fed passes, and a roller working in said recess, substantially as described.

2. The combination, with a nail-machine, of a reciprocating feeder provided with a tapering recess through which the material to be fed passes, a roller working in said recess, and a spring yielding in the direction of the feed of the material and operating to press the roller in the opposite direction, whereby said roller rolls over the material while the feeder is moving in one direction and clamps it when moving in the other, substantially as described.

3. The combination, in a nail-feeder and with a base and the bearing-block, of a wedge-block and rollers loosely held between said bearing and wedge blocks, substantially as described.

4. The combination, in a wire-nail feeder and with the base, of a frame secured thereto, a wedge-block supported within said frame, a bearing-block against which the wire bears, rollers adapted to travel against the inclines of the wedge-block, and a feed-plate provided with pins for holding the rollers in position, substantially as set forth.

5. The combination, in a feeder and with the feed-bar upon which the feeder is secured, of a frame B, a wedge-block supported by said frame, a bearing-block, rollers arranged between the latter and the wedge-block, a plate provided with pins to secure and limit the rollers, and a spring acting on said plate, substantially as set forth.

In testimony whereof we affix our signatures in presence of two witnesses.

HENRY HARTSUFF.
            JOSEPH MURPHY.

Witnesses:
   GEO. W. MILLER,
   W. D. WALLACE.